Oct. 25, 1960

G. J. HOWARD, JR., ET AL 2,957,648

CRANE HELICOPTER AND ITS CONTROLS

Filed May 13, 1958

INVENTORS
EDWARD F. KATZENBERGER
GEORGE J. HOWARD JR.

BY Jack N. McCarthy
AGENT

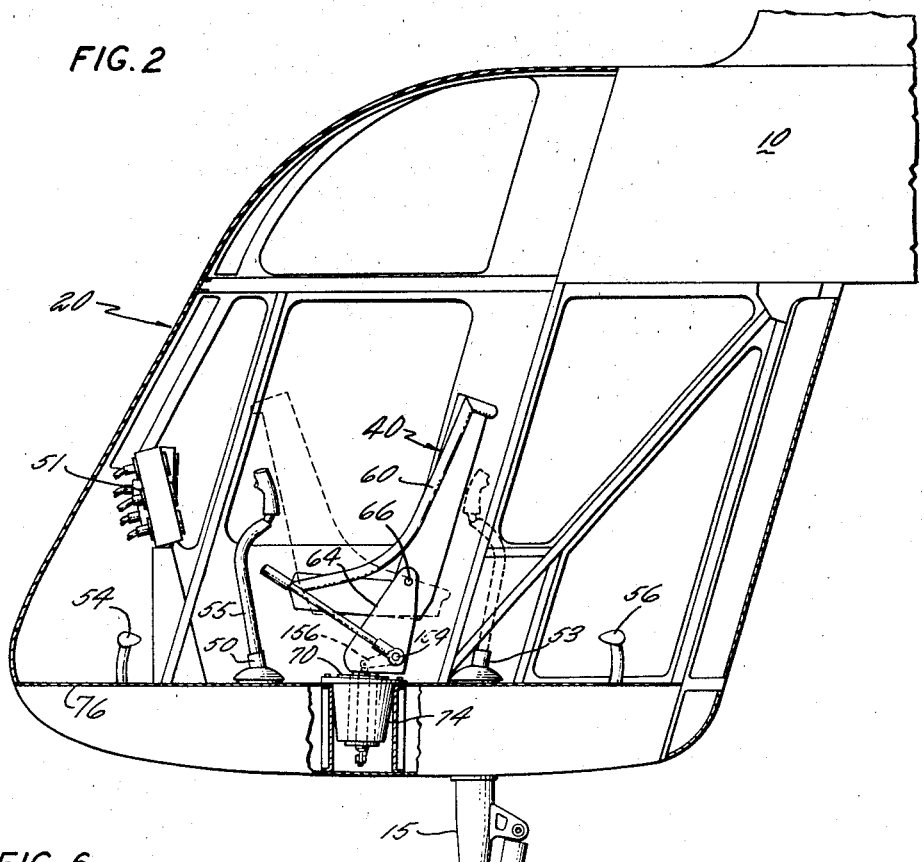
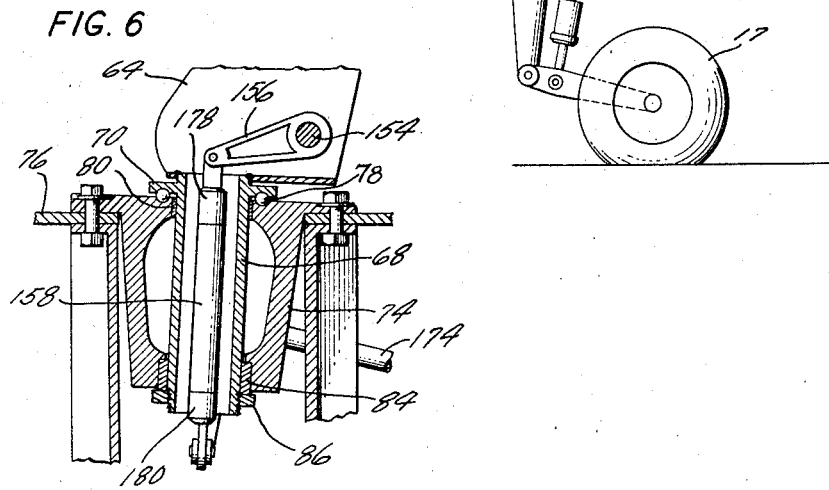

Oct. 25, 1960  G. J. HOWARD, JR., ET AL  2,957,648
CRANE HELICOPTER AND ITS CONTROLS
Filed May 13, 1958  3 Sheets-Sheet 3

INVENTORS
EDWARD F. KATZENBERGER
GEORGE J. HOWARD JR.
BY Jack N. McCarthy
AGENT

United States Patent Office 2,957,648
Patented Oct. 25, 1960

2,957,648

CRANE HELICOPTER AND ITS CONTROLS

George J. Howard, Jr., Fairfield, and Edward F. Katzenberger, Westport, Conn., assignors to United Aircraft Corporation, East Hartford, Conn., a corporation of Connecticut Filed May 13, 1958, Ser. No. 735,057

14 Claims. (Cl. 244—17.25)

This invention relates to a helicopter, constructed to operate as a flying crane, and its controls.

An object of this invention is to provide a crane helicopter in which the operator's view is improved by the virtual elimination of the cabin section of the fuselage.

Another object of this inevntion is to provide a crane helicopter in which an operator's seat can swivel giving him a direct view of a loading or unloading operation.

A further object of this invention is to provide controls for a crane helicopter which will provide an operator with a maximum degree of control.

Another object of this invention is to provide helicopter operating controls for use by the operator with the swivel seat in either a forward or rearward position.

A further object of this invention is to provide for a portion of the helicopter controls to extend through the member upon which the operator's seat rotates.

These and other objects and advantages of the invention will be pointed out in connection with the following detailed description of the drawings in which one embodiment is illustrated.

In the drawings:

Fig. 2 is an enlarged view of the operator's compartment;

Fig. 6 is an enlarged view of the seat mounting unit;

Figure 1:
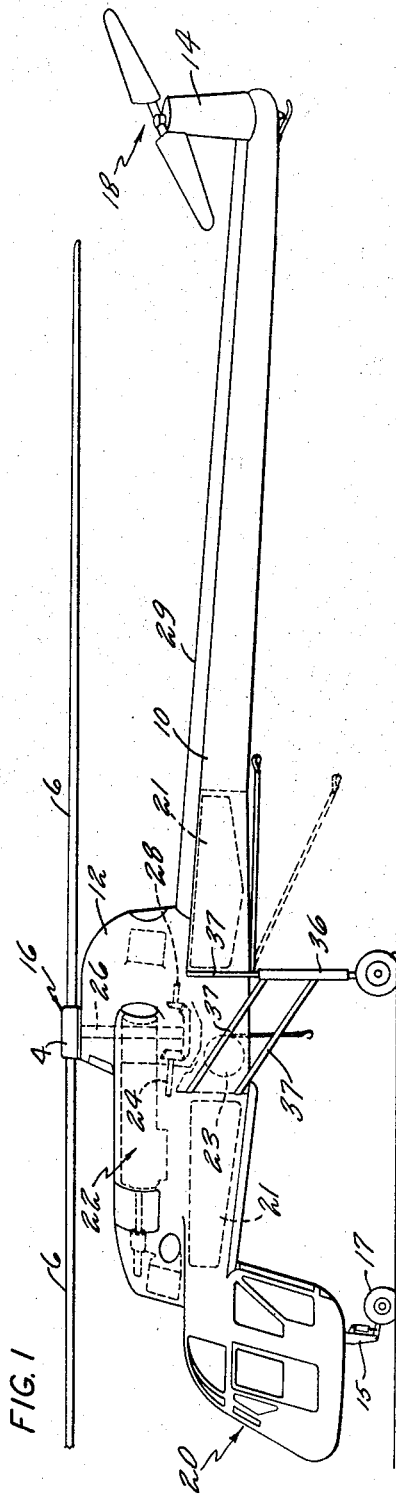
Fig. 1 is a side elevation of a crane helicopter.

Referring to Fig. 1, the crane helicopter embodying the invention comprises essentially an elongated fuselage 10 having a main rotor pylon 12 and a tail rotor pylon 14 on which are mounted the main rotor generally indicated at 16 and a tail rotor generally indicated at 18. The main rotor 16 comprises a rotor head 4 having rotor blades 6 mounted thereon for pitch changing movement. Rotor head 4 is rotated by a rotor shaft 26.

The fuselage 10 is constructed as a thin elongated structure having an operator's compartment 20 extending downwardly at its forward end. This fuselage is constructed of sufficient size to mount the powerplant section 22 along with the rotor 16 and house the necessary fuel system and control system. Fuel tanks 21 are shown position on each side of a winch 23.

In the helicopter structure shown, two jet engines are mounted on the fuselage in the powerplant section having an output drive 24 from therebetween. This drive in turn drives rotor shaft 26 and tail rotor drive shaft 28. A tail rotor drive shaft housing 29 covers the shaft 28.

The helicopter is supported on the ground by tricycle landing gear including main oleo struts 36 and wheels 38 and a nose strut 15 and wheel 17. The oleo struts 36 are supported on each side of the helicopter by laterally extending arms 37. These arms 37 are of such a length to permit the vertical oleo struts to be positioned a good distance outboard of the fuselage. This distance for a particular helicopter is regulated by the size of cargo for which the helicopter has been designed to carry.

The main rotor is simply shown in view of the fact that it does not form part of this invention. The rotor can be of the type shown in U.S. application Serial No. 741,531, filed June 12, 1958, as a continuation of U.S. application Serial No. 372,265, filed August 4, 1953, now abandoned, or U.S. application Serial No. 570,736, filed March 12, 1956.

Figure 3:
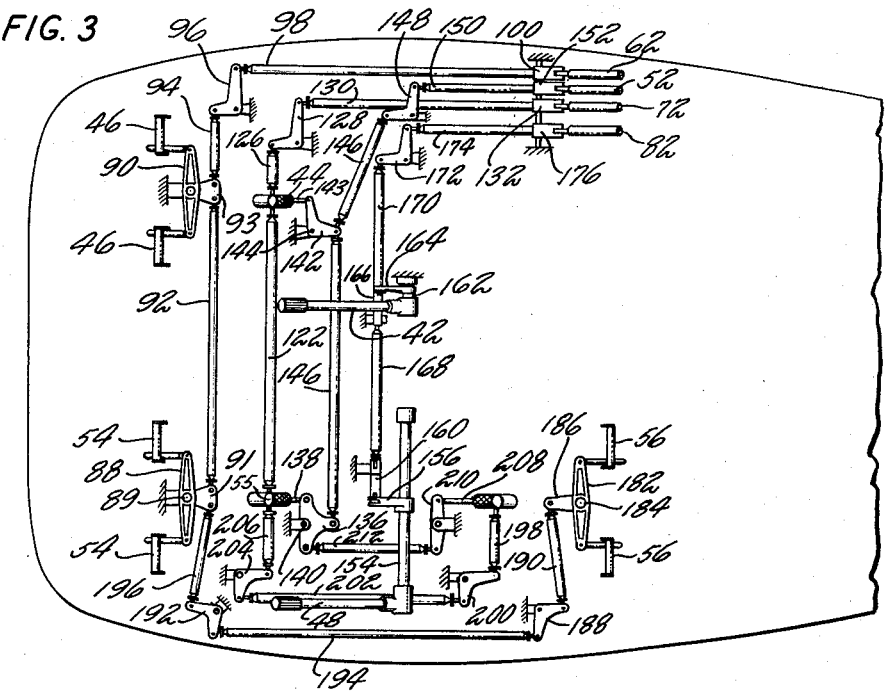
Fig. 3 is a view showing in detail the control arrangement under the floor in the operator's compartment.
Figure 4:
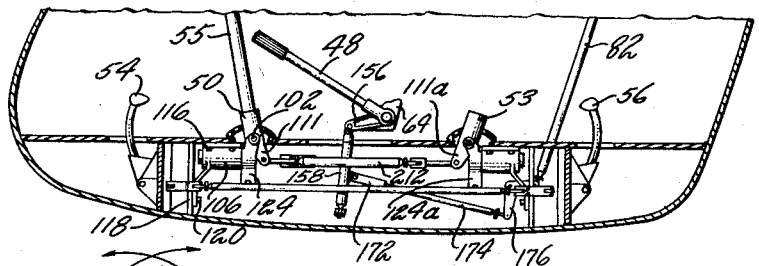
Fig. 4 is a plan view showing the control linkage.

Operator's compartment 20 (see Figs. 2, 3 and 4), houses two operator seats and controls for a pilot and copilot. The copilot's seat 40 is arranged to rotate so that the copilot can operate a third set of controls while facing rearwardly. This compartment 20 is enclosed on all sides by windows to provide an unobstructed view for the pilot and copilot in any direction. Instruments are positioned so that they can be viewed by the pilot and copilot such as on a panel 51. The pilot's control section comprises normal helicopter controls such as a collective pitch stick 42, cyclic control stick 44 and tail rotor foot control pedals 46. However, the copilot's controls comprise a collective pitch stick 48 which rotates with the seat 40 in a manner to be hereinafter described, two cyclic control stick receiving members 50 and 53 and two sets of tail rotor foot pedals 54 and 56. The cyclic control stick receiving members 50 and 53 are adapted to receive a cyclic control stick 55. Cyclic control stick receiving member 50 and pedals 54 are located for use when the copilot's seat is facing downwardly and cyclic control stick receiving member 53 and pedals 56 are located for use when the copilot's seat is facing rearwardly. The interconnection of these controls will be hereinafter described.

Copilot seat 40 is constructed having a seat section 60 mounted on a Y-member 64. The bifurcated part of the Y is attached to each side of the seat at a mounting point 66. The mounting device at this point can be constructed in many ways. It can be made adjustable to be angularly positioned at an operator's preference. The stem 68 of the Y-member 64 is formed as a tubular member having an annular flange 70 adjacent the top of the stem. Stem 68 forms a passageway from the bifurcated part of the member 64 to a point below the floor 76. A seat mounting unit 74 is fixedly mounted in the floor 76 of the pilot compartment 20. The mounting unit 74 is formed having an opening therethrough to receive the stem 68 of the Y-member 64. The surface of flange 70 adjacent the top of the seat mounting unit 74 is formed as a race as is the cooperating portion of the upper face of mounting member 74. Balls 78 are located between these races. While the bearing mechanism is shown as integral, a separate unit may be used. This bearing mechanism provides for thrust forces between the two members. A bearing bushing 80 is fixedly mounted within the seat member 74 around the upper portion of the stem 68 of Y-member 64 just below the thrust bearing. A bearing bushing 84 is located at the bottom of seat mounting unit 74 around the step 68 of Y-member 64. A holding nut 86 is positioned on the threaded end of stem 68 to prevent an upward movement of the seat in relation to the helicopter floor. It can be seen from this arrangement that the copilot seat is permitted to rotate between a forwardly facing posiion and a rearwardly facing position.

In the forwardly facing position, the copilot has available to him a set of tail rotor foot pedals 54. These are mounted on a double bell crank 88 having an arm extending outwardly from each side of its fixed pivot 89. The pilot has a set of tail rotor foot control pedals 46 mounted on a double bell crank 90 for the same purpose. Bell crank levers 88 and 90 have actuating arms 91 and 93, respectively, interconnected by a rod 92 extending rearwardly, to transmit identical movement therebetween. Movement of either set of pedals is transmitted to a tail rotor control rod 62 from actuating arm 93 of bell crank 90 by means of a rod 94, single bell crank 96, rod 98 and single bell crank 100. It can be seen that movement of either set of foot pedals reciprocates the tail rotor control rod 62. This rod can be connected to a conventional tail rotor control of a helicopter by any known means.

Figure 5:
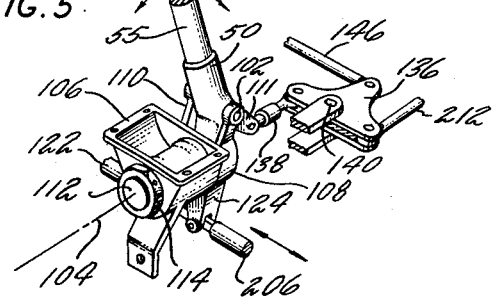
Fig. 5 is an enlarged view of the mounting for the cyclic pitch control stick.

Also in a forwardly facing position, the copilot has available to him a cyclic control stick receiving member 50 into which a cyclic control stick 55 fits to provide movement thereof. Member 50 is pivotally mounted for fore and aft movement about an axis 102 (see Fig. 5) and is pivoted for sideways or lateral movement about axis 104. The use of these two axes permits a universal movement of member 50.

The mounting unit for the stick receiving member 50 comprises a housing 106 fixed to aircraft structure, with a member 108 being mounted for rotation therein having a bifurcated bracket 110 extending upwardly from one side thereof and a projection 124 extending downwardly from the other side. This member 108 has a shaft member 112 extending through the housing 106 which is fixed against axial movement by a nut 114. The member 50 extends between the tines of bifurcated bracket 110 and has an extension 111 extending downwardly therefrom. Housing 106 is bolted to the floor of the pilot compartment 20 by bolts 116 and is connected to a brace member 118 under the floor by bolts 120. The pilot's cyclic control stick 44 is pivotally mounted in the same manner.

A rod 122 interconnects projection 124 of the mounting unit for the pilot's cyclic control stick 44 and projection 124 of the mounting unit for the copilot's cyclic control stick receiving member 50. This ties the pilot's control stick 44 and the copilot's cyclic control stick receiving member 50 together for like movement in a lateral direction. Movement of either the pilot's stick 44 or copilot's member 50 is transmitted to a conventional rotor head lateral control rod 72 from projection 124 of the mounting unit for pilot's stick 44 by means of a rod 126, single bell crank 128, rod 130 and single bell crank 132. It can be seen that movement of either projection 124 in a lateral direction reciprocates the control rod 72. This rod can be connected to a conventional lateral control of a rotor head by any known means.

The free end of extension 111 of member 50 is connected to one laterally extending arm of a double bell crank 136 by a link 138. Double bell crank 136 is pivotally mounted to the helicopter at 140. The free end of extension 111 of the pilot's stick 44 is connected to the laterally extending arm of a single bell crank 142 by rod 143. Bell crank 142 is pivotally mounted to the helicopter at 144. A rod 146 connects a rearwardly extending arm on double bell crank 136 to the free end of a rearwardly extending arm of bell crank 142. This ties the pilot's control stick 44 and the copilot's cyclic control stick receiving member 50 together for like movement in a fore and aft direction.

Movement of either the pilot stick 44 or copilot's member 50 is transmitted to a conventional rotor head fore and aft control rod 52 from bell crank 142 of the pilot stick 44 by means of a rod 146, single bell crank 148, rod 150 and single bell crank 152. It can be seen that movement of either extension 111 in a fore and aft direction reciprocates the control rod 52. This rod can be connected to a conventional fore and aft control of a rotor head by any known means.

The copilot also has a collective pitch stick 48 mounted on his rotatable seat 40. The stick is fixed on the left side of the Y-member 64 of seat 40 on the end of a shaft 154. Shaft 154 is mounted for rotation in the lower section of the bifurcated part. A bushing is located in each upwardly extending tine of the bifurcated part to rotatably support shaft 154. The collective pitch stick 48 is fixedly attached to one end of shaft 154 and a nut is suitably secured to the other end thereby insuring against axial movement. A lever arm 156 extends forwardly from shaft 154 between the upwardly projected tines of the bifurcated part of member 64 and is fixed thereto. It can be seen that when the collective pitch stick 48 is moved about shaft 154, lever arm 156 also moves the same number of degrees.

The free end of lever 156 is positioned over the center of the tubular stem 68. A link 158 is pivotally attached to the free end of lever 156 and extends through the tubular stem 68 to a point below the end of stem 68. The lower end of link 158 is attached to a laterally extending arm of a bell crank lever 160.

The pilot has a collective pitch stick 42 which is pivotally mounted on a shaft 162 which is rotatably mounted on a helicopter. A lever arm 164 extends forwardly from shaft 162 and is fixed thereto. The free end of lever 164 is fixed to a laterally extending projection on a single bell crank 166. A rod 168 connects an upwardly extending projection on single bell crank 160 to the free end of a downwardly extending projection of single bell crank 166. This ties the pilot's collective pitch stick 42 and the copilot's collective pitch stick 48 together for like movement. Movement of either the pilot's stick 42 or copilot's stick 48 is transmitted to a conventional rotor head collective pitch control rod 82 from bell crank 166 by means of a rod 170, bell crank 172, rod 174 and single bell crank 176. It can be seen that movement of either the pilot's or copilot's stick about its pivotal axis will reciprocate the control rod 82. This rod can be connected to a conventional collective pitch control of a rotor head by any known means. Link 158 is constructed having a rotatable upper and lower portion 178 and 180 which permits rotation of the copilot's seat 40 and collective pitch stick 48 while maintaining an operating connection between the stick 48 and collective pitch control rod 82.

Now with the copilot's seat in a rearwardly facing position, the copilot has available to him a set of tail rotor foot pedals 56. These are mounted on a double bell crank 182 having an arm extending outwardly from each side of its fixed pivot 184. Bell crank lever 182 has an actuating arm 186 interconnected with the actuating arm 91 of bell crank lever 88 for transmitting movement to the tail rotor control. The free end of arm 186 is connected to the rearwardly extended arm of single bell crank 188 by a rod 190. A laterally extending arm on said bell crank is connected to a laterally extending arm on another single bell crank 192 by a rod 194. A forwardly extending arm on single bell crank lever 192 is connected to the free end of actuating arm 91 by a rod 196. It can be seen that movement of tail rotor foot control pedals 56 is transmitted to tail rotor control rod 62 from actuating arm 91 by the same linkage as by normal transmission from foot pedals 54. In this arrangement of the three sets of tail rotor foot control pedals they are all interconnected to move together and to operate the tail rotor control.

Also in a rearwardly facing position, a copilot has available to him a cyclic control stick receiving member 53 into which cyclic control stick 55 fits to provide movement thereof. This cyclic control stick receiving member 53 is pivotally mounted in the same manner as member 50. Projection 124 of the mounting unit for the copilot's cyclic control stick receiving member 53 is connected to the projection 124a of the mounting unit for the copilot's cyclic control stick receiving member 50 by a rod 198, single bell crank 200, rod 202, single bell crank 204 and rod 206. Rod 198 has one end connected to the free end of projection 124 of the mounting unit for member 53 and its other end connected to an arm extending rearwardly of the bell crank 200. A laterally extending arm of bell crank 200 is connected to a laterally extending arm of bell crank 204 by rod 202. A rearwardly extending arm of bell crank lever 204 is connected to the free end of extension 124 of the mounting unit for member 50 by the rod 206. It can be seen that movement of either projection 124 in a lateral direction will move the other in a similar manner. This construction of the lateral controls provides for movement of the stick 44 and members 50 and 53 together. Movement of the stick or any member will operate the lateral control of the rotor.

The free end of extension 111a of member 53 is connected to the free end of extension 111 of member 50 by a rod 208, lever 210, rod 212, and double bell crank lever 136. Rod 208 has one end connected to the free end of extension 111 of member 53 and its other end connected to a laterally extending arm of pivoted lever 210. An arm extending in the opposite lateral direction forming the rest of lever 210 is connected to a laterally extending arm of double bell crank lever 136 by a rod 212. This ties the copilot's cyclic control stick receiving member 53 and the copilot's cyclic control stick receiving member 50 together for like movement in a fore and aft direction. In this control arrangement, the pilot's stick 44 and copilot's member 50 and 53 are linked for movement together and to control a conventional rotor head fore and aft control.

Figure 7:
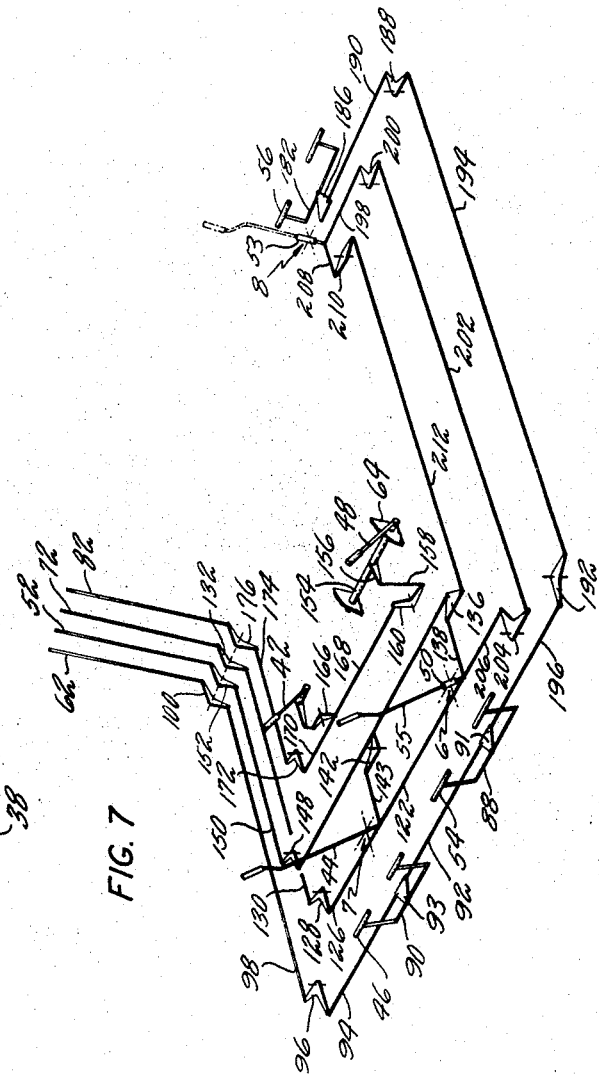
Fig. 7 is a schematic view of the control system.

The mounting unit for the stick receiving member 50 is shown schematically at 6 in Fig. 7 and the mounting unit for the control stick 44 is shown schematically at 7. The mounting unit for the stick receiving member 53 is shown schematically at 8 in Fig. 7. In this schematic representation, the members 50 and 53 and stick 44 are shown universally pivoted between their ends and are connected in the control system at their lower ends by pivotal connections to the rods extending therefrom. This has been done to simulate the action of each mounting unit.

The interconnecting rods of the control system are of the type which are changeable in length and capable of being locked at a desired length. This permits the control system to be properly positioned for accurate movement.

The copilot in changing from a position facing forwardly to a position facing rearwardly, need only remove the cyclic control stick 55 from its receiving member 50, rotate his seat 180°, then insert the cyclic control stick 55 in the stick receiving member 53. While making this move, he has control of the collective pitch of the blades through the collective pitch stick 48 at all times. The pilot, or other means, can maintain the control rods 52 and 72 in their proper position while the copilot is making his move.

It is to be understood that the invention is not limited to the specific embodiment herein illustrated and described, but may be used in other ways without departure from its spirit as defined by the following claims.

We claim:

1. In a helicopter having a rotor head, blades mounted thereon for pitch changing movement, an operator's control stick, an operator's seat having a hollow supporting member, and means passing through said hollow member operatively connecting said stick and said blades for adjusting the pitch of the blades.

2. In a helicopter having a rotor head, blades mounted thereon for pitch changing movement, an operator's control stick, an operator's seat mounted for rotation having a hollow supporting member, the axis of said member being the axis about which the operator's seat rotates, and means passing through said hollow member operatively connecting said stick and said blades for adjusting the pitch of the blades.

3. In a helicopter having a rotor head, blades mounted thereon for pitch changing movement, an operator's control stick, an operator's seat having a hollow supporting member, said stick being mounted on said seat, and means passing through said hollow member operatively connecting said stick and said blades for adjusting the pitch of the blades, said means including a link in said hollow member, said stick being connected to said link to move it axially in said hollow supporting member.

4. In combination in a helicopter, a rotor head, blades mounted on said head for pitch changing movement, an operator's seat, means for rotatably mounting said seat so that it can rotate between at least two positions, means for collectively changing the pitch of said blades, said last named means including a lever pivotally mounted on said seat for movement therewith.

5. In a helicopter having a rotor head, blades mounted thereon for pitch changing movement, an operator's seat, said seat having a seat portion, said seat portion being mounted between a pair of upstanding arms, said arms being connected to a hollow supporting member, an operator's control stick, said stick being mounted by one of said arms, and means passing through said hollow member operatively connecting said stick and said blades for adjusting the pitch of the blades.

6. In a helicopter having a rotor head, blades mounted thereon for pitch changing movement, an operator's seat, said seat having a seat portion, said seat portion being mounted between a pair of upstanding arms, said arms being connected to a hollow supporting member, an operator's control stick, a shaft supported for rotation by said arms, said stick being fixedly mounted on said shaft, a lever fixedly mounted on said shaft to move with said stick, and means passing through said hollow member operatively connecting the free end of said lever and said blades for adjusting the pitch of the blades.

7. In a helicopter having a rotor head, blades mounted thereon for pitch changing movement, an operator's seat, said seat having a seat portion, said seat portion being mounted between a pair of upstanding arms, said arms being connected to a hollow supporting member, an operator's control stick, a shaft supported for rotation by said arms, said stick being fixedly mounted on said shaft, a lever fixedly mounted on said shaft to move with said stick, means operatively connected to said blades for changing the pitch of said blades, and a link passing through said hollow member operatively connecting the free end of said lever and said means for changing the pitch of the blades.

8. In a helicopter having a rotor head, a fuselage, blades mounted on said rotor head for pitch changing movement, an operator's control stick, an operator's seat mounted for rotation having a hollow supporting member, seat mounting means being attached in said fuselage, said hollow supporting member being mounted in said seat mounting means for rotation, said stick being mounted on said seat, and means passing through said hollow member operatively connecting said stick and said blades for adjusting the pitch of the blades, said means including a link in said hollow member, said stick being connected to said link to move it axially in said hollow supporting member.

9. In combination in a helicopter, a rotor head, blades mounted on said head for pitch changing movement, an operator's seat, means for rotatably mounting said seat so that it can rotate between a forwardly facing position and a rearwardly facing position, first means for collectively changing the pitch of said blades, said first means including a lever pivotally mounted on said seat for movement therewith, second means for cyclically changing the pitch of said blades, said second means having a cyclic stick receiving member in front of said seat and a cyclic stick receiving member in back of said seat.

10. In combination in a helicopter, a rotor head, blades mounted on said head for pitch changing movement, an operator's seat, means for rotatably mounting said seat so that it can rotate between at least two positions, first means for collectively changing the pitch of said blades, said first means including a lever pivotally mounted on said seat for movement therewith, second means for cyclically changing the pitch of said blades, said second means having a cyclic stick receiving member at one location around said seat and a cyclic stick receiving member at another location around said seat.

11. In a helicopter, a rotor head, blades mounted thereon for pitch changing movement, an operator's control stick, an operator's seat mounted below said rotor head for rotation having a hollow supporting member, and means passing through said hollow member operatively connecting said stick and said blades for adjusting the pitch of the blades.

12. In a helicopter, a body, an operator's compartment extending downwardly from said body, a rotor head mounted for rotation on said body, blades mounted on said rotor head for pitch changing movement, an operator's control stick, an operator's seat in said compartment having a hollow supporting member, and means passing through said hollow member operatively connecting said stick and said blades for adjusting the pitch of the blades.

13. In a helicopter, a body, an operator's compartment extending downwardly from said body, a rotor head mounted for rotation on said body, blades mounted on said rotor head for pitch changing movement, an operator's control stick, an operator's seat in said compartment, a hollow supporting member, said seat being mounted on said hollow supporting member for rotation, and means passing through said hollow member operatively connecting said stick and said blades for adjusting the pitch of the blades.

14. In a helicopter, a body, an operator's compartment extending downwardly from said body, a rotor head mounted for rotation on said body, blades mounted on said rotor head for pitch changing movement, an operator's control stick, an operator's seat in said compartment, a hollow supporting member, said seat being mounted on said hollow supporting member for rotation, said control stick being mounted on said seat, and means passing through said hollow member operatively connecting said stick and said blades for adjusting the pitch of the blades.

References Cited in the file of this patent

UNITED STATES PATENTS

| | | |
|---|---|---|
| 1,909,450 | Bleecker | May 16, 1933 |
| 2,371,687 | Gerhardt | Mar. 20, 1945 |
| 2,753,004 | Jovanovich | July 3, 1956 |

FOREIGN PATENTS

| | | |
|---|---|---|
| 495,022 | Great Britain | Nov. 1, 1938 |